US008185824B1

(12) United States Patent
Mitchell et al.

(10) Patent No.: US 8,185,824 B1
(45) Date of Patent: *May 22, 2012

(54) METHOD AND APPARATUS PROVIDING A GRAPHICAL USER INTERFACE FOR REPRESENTING AND NAVIGATING HIERARCHICAL NETWORKS

(75) Inventors: Frederick H. Mitchell, Nashua, NH (US); David K. Bainbridge, Acton, MA (US)

(73) Assignee: Cisco Technology, Inc., San Jose, CA (US)

( * ) Notice: Subject to any disclaimer, the term of this patent is extended or adjusted under 35 U.S.C. 154(b) by 721 days.

This patent is subject to a terminal disclaimer.

(21) Appl. No.: 11/880,853

(22) Filed: Jul. 23, 2007

Related U.S. Application Data

(63) Continuation of application No. 10/629,811, filed on Jul. 29, 2003, now abandoned, which is a continuation of application No. 09/208,554, filed on Dec. 9, 1998, now Pat. No. 6,628,304.

(51) Int. Cl.
*G06F 15/177* (2006.01)

(52) U.S. Cl. ......... 715/734; 715/735; 715/736; 715/853

(58) Field of Classification Search .......... 715/734–740, 715/853–855; 709/223, 224
See application file for complete search history.

(56) References Cited

U.S. PATENT DOCUMENTS

| 5,295,243 | A |   | 3/1994  | Robertson        |
|-----------|---|---|---------|------------------|
| 5,590,250 | A |   | 12/1996 | Lamping          |
| 5,606,654 | A |   | 2/1997  | Schuur           |
| 5,619,632 | A |   | 4/1997  | Lamping et al.   |
| 5,726,979 | A |   | 3/1998  | Henderson        |
| 5,751,965 | A |   | 5/1998  | Mayo et al.      |
| 5,796,951 | A |   | 8/1998  | Hamner           |
| 5,805,819 | A |   | 9/1998  | Chin             |
| 5,808,609 | A |   | 9/1998  | Guha             |
| 5,870,559 | A |   | 2/1999  | Leshem et al.    |
| 5,909,217 | A |   | 6/1999  | Bereiter         |
| 5,926,180 | A | * | 7/1999  | Shimamura ............ 715/739 |
| 5,926,463 | A | * | 7/1999  | Ahearn et al. ............ 370/254 |
| 5,968,122 | A |   | 10/1999 | Schlosser        |
| 5,974,572 | A | * | 10/1999 | Weinberg et al. ............ 714/47 |
| 6,014,697 | A |   | 1/2000  | Lewis et al.     |
| 6,040,834 | A |   | 3/2000  | Jain et al.      |
| 6,044,405 | A |   | 3/2000  | Driscoll, III et al. |
| 6,046,988 | A |   | 4/2000  | Schenkel et al.  |
| 6,058,103 | A |   | 5/2000  | Henderson et al. |
| 6,061,723 | A |   | 5/2000  | Walker et al.    |
| 6,101,500 | A |   | 8/2000  | Lau              |

(Continued)

OTHER PUBLICATIONS

Office Action Mail Date Jul. 8, 2002, U.S. Appl. No. 09/208,554, 8 pages.

(Continued)

*Primary Examiner* — Ba Huynh

(57) ABSTRACT

A method and apparatus are provided which present hierarchical data to a user via a graphical user interface. In the interface, hierarchical data is represented by nodes, beginning with one or more top nodes and extending into lower hierarchical levels by the display of child nodes, child's child nodes, and so forth. The arrangement of nodes on the graphical user interface is such that scaling portrays the various hierarchical levels, and nodes do not spatially interfere with one another. Navigation through the hierarchical data is provided by allowing the user to select any visible node, at which point a zoom-in or zoom-out view to the selected node as a centrally located node on the interface is performed.

29 Claims, 8 Drawing Sheets

U.S. PATENT DOCUMENTS

| | | | |
|---|---|---|---|
| 6,115,743 | A | 9/2000 | Cowan et al. |
| 6,128,016 | A | 10/2000 | Coelho |
| 6,144,962 | A | 11/2000 | Weinberg |
| 6,205,122 | B1 | 3/2001 | Sharon et al. |
| 6,222,559 | B1 * | 4/2001 | Asano et al. ............ 345/440 |
| 6,237,006 | B1 | 5/2001 | Weinberg et al. |
| 6,259,451 | B1 * | 7/2001 | Tesler ............ 345/419 |
| 6,304,262 | B1 | 10/2001 | Maloney et al. |
| 6,341,310 | B1 | 1/2002 | Leshem et al. |
| 6,356,285 | B1 | 3/2002 | Burkwald et al. |
| 6,374,293 | B1 | 4/2002 | Dev et al. |
| 6,392,667 | B1 | 5/2002 | McKinnon |
| 6,509,898 | B2 * | 1/2003 | Chi et al. ............ 345/440 |
| 6,628,304 | B2 | 9/2003 | Mitchell et al. |
| 6,654,761 | B2 | 11/2003 | Tenev et al. |

OTHER PUBLICATIONS

Office Action Mail Date Apr. 11, 2002, U.S. Appl. No. 09/208,554, 7 pages.
Office Action Mail Date Oct. 11, 2001, U.S. Appl. No. 09/208,554, 10 pages.
Office Action Mail Date Apr. 24, 2001, U.S. Appl. No. 09/208,554, 8 pages.
Office Action Mail Date Feb. 21, 2007, U.S. Appl. No. 10/629,811, 20 pages.
Notice of Abandonment Mail Date Oct. 11, 2007, U.S. Appl. No. 10/629,811, 2 pages.
Notice of Allowance Mail Date Mar. 24, 2003, U.S. Appl. No. 09/208,554, 6 pages.
Mandelbrot, B.B., *The Fractal Geometry of Nature*, W.H. Freeman and Co., New York (This book was submitted in the grandparent application, U.S. Appl. No. 10/629,811, now U.S. Patent No. 6,628,304.) A new book is not being resubmitted but can be if specifically instructed to do so, 1988.
H. Koike and H. Yoshihara, "Fractal Approaches for Visualizing Huge Hierarchies," *IEEE*, 1049-2615/93, 1993.
HP OpenView for Windows Workgroup Node Manager User Guide, Jan. 1997.
HP OpenView for Windows Workgroup Node Manager Technical Evaluation Guide, Apr. 1994.
HP OpenView for Windows SNMP Platform Technical Evaluation Guide, Apr. 1994.
HP OpenView for Windows Version 7.2 Programmer's Guide, Jul. 1994.
SunSoft/Sun Microsystems, SunNet Manager 2.2.3 Reference Manual, Part No. 801-6986-10, Revision A of Oct. 1995.
SunSoft/Sun Microsystems, SunNet Manager 2.2.3 User's Guide, Part No. 802-4521-10, Revision A of Oct. 1995.
SunSoft/Sun Microsystems, SolsticeSite/SunNet/DomainManager Administration Guide (1996).
SunSoft/Sun Microsystems, SolsticeSite/SunNet/DomainManager Reference Manual (1996).

* cited by examiner

METHOD AND APPARATUS PROVIDING A GRAPHICAL USER INTERFACE FOR REPRESENTING AND NAVIGATING HIERARCHICAL NETWORKS

RELATED APPLICATIONS

This application is a continuation of U.S. application Ser. No. 10/629,811, filed Jul. 29, 2003 now abandoned, which is a continuation of U.S. application Ser. No. 09/208,554, filed Dec. 9, 1998, now U.S. Pat. No. 6,628,304. The entire teachings of the above applications are incorporated herein by reference.

COMPUTER PROGRAM LISTING APPENDIX

A computer program listing in Appendix A on associated CD-ROM and duplicate CD-ROM having file name "2386-1034-001 Appendix A—Source Code.txt", created Jul. 18, 2003, 46.2 Kbytes is being filed concurrently herewith; the entire teachings inherent therein are incorporated herein by reference.

FIELD OF THE INVENTION

The present invention relates to graphical user interfaces, and more specifically, to a computer system employing a software application providing a specialized graphical user interface to efficiently manage, view and navigate relationships between objects having hierarchical relationships with one another, such as those in computer network management applications.

BACKGROUND OF THE INVENTION

In computer systems, the way in which data is represented to a user is of great importance in many circumstances. Through graphical user interfaces (GUI's), visual representations of data can improve a persons understanding of relationships and characteristics which exist intrinsically within the data. For example, data having fields that have one to one relationships with other fields can be effectively represented using a spreadsheet, with certain fields displayed in a left hand column, and other fields displayed across a top row. Data that is hierarchically related is not well suited for representation within a spreadsheet. Rather, a graphical tree-like structure may be used to represent hierarchical data. The tree depicts a top or parent node for the highest level of data, and has child nodes extending or depending from the parent node. Child nodes represent lower levels in the hierarchy and each successively lower level in the tree is populated with data from successively lower levels in the hierarchy. The overall tree can be displayed in a vertical or horizontal manner with nodes extending outward or downward at each successively lower level, beginning at the top level with the parent node.

There are many sources of hierarchically organized data, and certain systems are better represented hierarchically than others. Computer networks and individual computer systems generate data which can be effectively represented in a hierarchical manner.

In the case of a single computer system or data communications device, data stored in a directory on a disk is often hierarchically arranged using folders and sub-directories. Each directory of files and folders represents a separate level in the hierarchy. The hierarchical directory structure of a computer disk provides a convenient way to organize data and files based on characteristics such as file types or on the purpose for which the files and/or data is used.

Computer networks, on the other hand, typically comprise a combination of computer systems interconnected with a number of network communications devices such as modems, hubs, routers, bridges, switches and so forth. The way in which information is transferred over the computer network is based upon which data communications protocols are in operation and upon how each device is configured or managed. Typically the devices and computers on a single network are owned and managed by an individual entity or enterprise. By way of example, universities or companies typically own, operate, manage and control a network of computers and data communication devices which form a campus or corporate-wide data communications network. Such networks may be interconnected with other networks, such as those from government agencies, or other entities, to form a worldwide system of interconnected networks, such as the Internet.

An entire computer network can be broken down logically into various hierarchical levels. For instance, a high speed fiber optic link controlled by high speed routers can form the first level in a hierarchy. This top level network may interconnect many smaller regional networks associated with specific buildings, cities, or geographical areas, each of which represents a second level in the network hierarchy. Each regional network may interconnect specific purpose departmental networks representing a third level in the network hierarchy. Each departmental network may include many individual subnetworks of computers, terminals, printers, file and web servers, and so forth to form the fourth level of the hierarchy, and so forth. Each computer and data communications device may then be considered on an individual basis as the fifth level in the hierarchy and may include various internal devices or peripherals which form a sixth hierarchical level.

Due to the large amounts of hierarchical data maintained in individual computer systems and computer networks, these systems must be effectively managed or users will quickly begin to lose productivity. Computer systems management refers to the organization, storage and control of data within one or more computing devices. Computer network management refers to the ability to control the operation of computers and associated data communications devices on a network to provide efficient routing of data and network operation. Software applications have been developed for these hierarchical management tasks.

A typical computer systems management software application presents a graphical user interface to the user which displays information about the computer system. A widely known prior art computer management application called "File Manager", produced by Microsoft Corporation of Redmond Wash., can display hierarchical disk directory structure information in a horizontal tree-like manner. File manager is usually used for simple computer systems management tasks such as organizing files and directories. File Manager examines the file structure on a disk and displays directories and files which are at the same level in the hierarchy as small folder and file icons arranged in columns associated with that level. If files and/or sub-folders exist within other folders, File Manager displays file and sub-folder icons underneath and indented to the right of the parent folder icon in which those files and sub-folders exist. The icons are displayed as a tree using interconnected lines which form a path back to the uppermost folder in the directory. The indentation and positioning of file and folder icons provides a visualization of the hierarchical nature of the file system structure for the portion which is graphically displayed.

In the case of computers networks, network management software applications are used to display and control the data communication devices that form the network. Network management software executes on a management workstation coupled to the network and allows a network administrator to remotely control the operation of the network devices. Remote operation and management of devices is provided by standardized protocols such as the Simple Network Management Protocol (SNMP) and the Remote Monitoring (RMON) protocol. SNMP, for example, provides device agents which execute on each remotely located network device under management control. The device agents communicate with the network management software application. Each SNMP device agent can collect data related to the operation of the device and can report problems back to the management application. The management application can control each device, via instructions sent to the device agent. For instance, if a router in a network is experiencing congestion due to high data traffic, the agent in that router may be instructed by the network manager, using the network management application, to re-route certain data to an underutilized segment of the network. SNMP data is stored in a Management Information Base, or MIB, which can be hierarchically arranged.

Current network management applications present the structure of the managed network in a graphical tree-like manner, much like the computer system management applications (i.e., File Manager) discussed above. Essentially, the management software displays a graphical representation of the physical network as long lines with devices located at various locations. The image of a large computer network can grow to become quite lengthy, having hundreds, or even thousands of devices extending therefrom. The network manager can graphically navigate around the network by scrolling the image of the network left or right on the display using, for example, a mouse pointer to select left/right and up/down scroll bars. When an icon is displayed representing a network device of interest, the network manager can select this device. Device selection causes data associated with that device to be displayed. The data is typically device statistic data obtained from the SNMP MIB for that device.

SUMMARY OF THE INVENTION

Various problems are present in the ways in which prior art systems display and navigate through hierarchically arranged data. Since the data is represented more or less as a tree-like structure, only certain portions of the tree are displayable at any one time. For instance, in both the computer network management application and in the File Manager application noted above, only localized portions of a large hierarchy of data are visible to the user. In File Manager, if a folder icon contains many sub-files and folders, and this folder is selected, the display is re-drawn to show (i.e., to make visible) all of the sub-folders and files within the selected folder. In the network management case, a network manager often spends much of his or her time simply navigating around the image in order to arrive at the location of the device desired.

The problem with this is that once the desired object (i.e., networked device or file or other data) is arrived at, the user can no longer see a general representation of the folders, files, network devices, network structure or hierarchical data at the same level or above the parent folder, other than the data immediately surrounding the object displayed. That is, since the interface displays an extended file listing or a large network segment as a relatively flat object, the object and its neighboring objects are rarely visible at the same time. This is because the tree-like display or an extended graphical representation of a network segment only provides a limited amount of space for displaying various levels of hierarchical data, and there is little scalability to different levels of detail. In other words, once more than a few heavily populated folders or network segments are expanded via user selection, the user quickly becomes disoriented with respect to what area or location of the file system, network or other hierarchical data representation they are currently viewing.

Another problem with tree-like interfaces used to display hierarchical data is that navigation becomes difficult. Once a user is viewing a detailed list of the contents of one level of the hierarchy, for example, a large network segment, it is quite often the case that scrolling is required within the list of items (i.e., files or network nodes for example) in order to make visible the item of interest at that level or on that segment. Once the parent folder or graphical object (i.e., icon) containing the lower level items is scrolled off the display, the user must re-scroll back to where the parent folder is visible in order to navigate up to the next level in the hierarchy by re-selecting the parent object. alternatively, the user must condense one or more icons representing neighboring devices or folders, for example, in order to "make room" on the display for one or more devices of interest. Still further, to, for example, delve "down" into a hierarchy having many levels, the user must select a device of interest at each level and "enter" the level of that device, then find and select the next device at that level, and select and "enter" the next level, and so on and so forth. In general, this problem requires many redundant selection, scrolling, finding, selection, scrolling, finding and deselecting operations just to find a particular item within the hierarchy of interest. Once found, the user oftentimes does not recall where they are currently in the hierarchy, and must return "up" to higher levels to gain a sense of direction within the graphical user interface.

The aforementioned problems combine to have a pronounced effect when using prior art hierarchical interfaces to perform tasks such as moving and copying objects from one level to another. For instance, if a file located at a lower level in the hierarchy is to be copied to another location elsewhere in the hierarchy, a typical interface supports the drag-and-drop concept. In drag-and-drop, the user should be able to find a file, select it, and while maintaining it in a selected state (i.e, with a mouse pointer), the user should be able to drag the file icon to another location and release selection of the item. The interface will interpret this action as an intent to copy the file or item to that location. However, in tree-like hierarchical interfaces, this becomes difficult due to the requirements of having to scroll from one location to another in the hierarchy in order to find the source and destination for an item. It is frequently the case that the source and destination cannot be arranged so as to both be visible on the screen at once. In such a case, an alternative means of copying the item must be used.

Similar problems exist for network management applications which attempt to display a network hierarchy as a tree-like structure. The network manager must scroll through a potentially lengthy graphical display of network communication lines in order to arrive at a device of interest. After selecting the device to view data associated with the device, and then reverting to the graphical view, the user may not recall the whereabouts of the current location within the network.

The present invention avoids these problems with prior art interfaces designed to represent hierarchical data. The invention provides a unique interface and navigation mechanism within the interface to effectively represent a large number of hierarchical levels while at the same time presenting the user with a sense of location within the hierarchy.

More specifically, the invention provides a computer system comprising at least one input device, an output device, a memory device, and a processing unit coupled to the input device, the output device and the memory device. The computer system in a preferred embodiment is a network management workstation. The processing unit executes a computer program stored in the memory device. Preferably, the computer program is a network management software application, such as the CiscoWorks2000 network management software manufactured by Cisco Systems, Inc. of San Jose, Calif. The computer program controls the output device to display a graphical user interface and controls the input device(s) to accept input to manipulate a view of objects displayed within the graphical user interface. The graphical user interface displays objects derived from hierarchically arranged data, wherein each object displayed is graphically scaled in size and proportion directly to the level of the hierarchy to which it relates and is positioned in relation to other objects within the hierarchy of the data. Due to the arrangement of objects in the GUI, the invention overcomes the aforementioned problems of prior art systems related to navigation and conceptualization of where the user is within the hierarchy of data represented.

Preferably, one or more child objects directly related one level below a parent object in the hierarchy will be positioned radially adjacent to and equidistantly from the parent object. The child nodes can be spaced equidistant from each other as well. The child objects are scaled smaller than the parent object from which they depend in the hierarchy thus indicating their presence on a lower hierarchical level. All objects on a level can be similarly colored, but can be differently colored from objects at different levels, thus further distinguishing hierarchical levels.

An embodiment of the interface described herein can be used, for example, by a network management graphical user interface monitoring program for use in computer network management, such as the CiscoView application manufactured by Cisco Systems, Inc. of San Jose, Calif. CiscoView provides a graphical user interface representing real time network data and devices in order to allow user to easily understand large volumes of network management data. The interface described herein can be used in such an application.

Also within the computer system, each object displayed on the graphical user interface is depicted graphically as being interconnected to other objects to which it is directly related to in a hierarchy of the data, so as to form a graphical representation of the hierarchical nature of each object as it relates to other objects. This interconnection represents data links in a computer network, for example. Also within the computer system, an object hierarchically related directly above another object is a parent object and is displayed larger, and an object hierarchically related directly below another object is a child object and is displayed adjacent to and smaller than the parent object. With these definitions, the input device may be used to select a child object on the graphical user interface and, in response, the computer program will generate a zoom-in view of that child object including any child objects related to that child object. This allows a user to easily navigate up and down and across levels within the hierarchy.

To zoom-in to a level, the graphical user interface displays a first view of individually selectable hierarchically arranged objects including a parent object and a plurality of child objects peripherally arranged about the parent object. Then, upon a zoom-in selection of a child object with the input device, the processing unit executes the computer program to transform the display of the graphical user interface to a zoomed-in view in which the parent object is relocated and proportionally increased in size to appear as a grand-parent object and the child object selected is relocated and proportionally increased in size to appear as a centrally located parent object. Furthermore, previously undisplayed child objects that are hierarchically related below the child object selected become displayed and peripherally arranged about the centrally located parent object. In this manner, each time the user changes levels in the hierarchy, new levels are exposed.

The system also provides a zoom-out capability wherein upon a zoom-out selection of the grand parent object with the input device, the processing unit executes the computer program to transform the display of the graphical user interface to a zoomed-out view. In the zoom-out view, child objects disappear from the graphical user interface and the first parent object is proportionally reduced in size to appear as a child object and the grand-parent object is relocated and proportionally reduced in size to appear as a centrally located parent object and the child object and other previously undisplayed child objects that are hierarchically related below the centrally located parent object become displayed and peripherally arranged about the centrally located parent object. Essentially, zoom-out is the reverse of zoom-in and allows the user to navigate up levels in the hierarchy.

The graphical user interface further includes a locale map providing a user with an indication of where in the hierarchy the objects exist that are currently on display in the graphical user interface. The locale map allows the user to move up and down any number of levels that are displayed in the locale map merely by selecting the node at the level desired. The GUI is then redrawn with the selected node as the centrally located node and displays child nodes, and any parent nodes, as noted above.

By providing an interface of this sort, any type of hierarchical data can be represented and explored in a fast and efficient manner without getting lost in the hierarchy.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
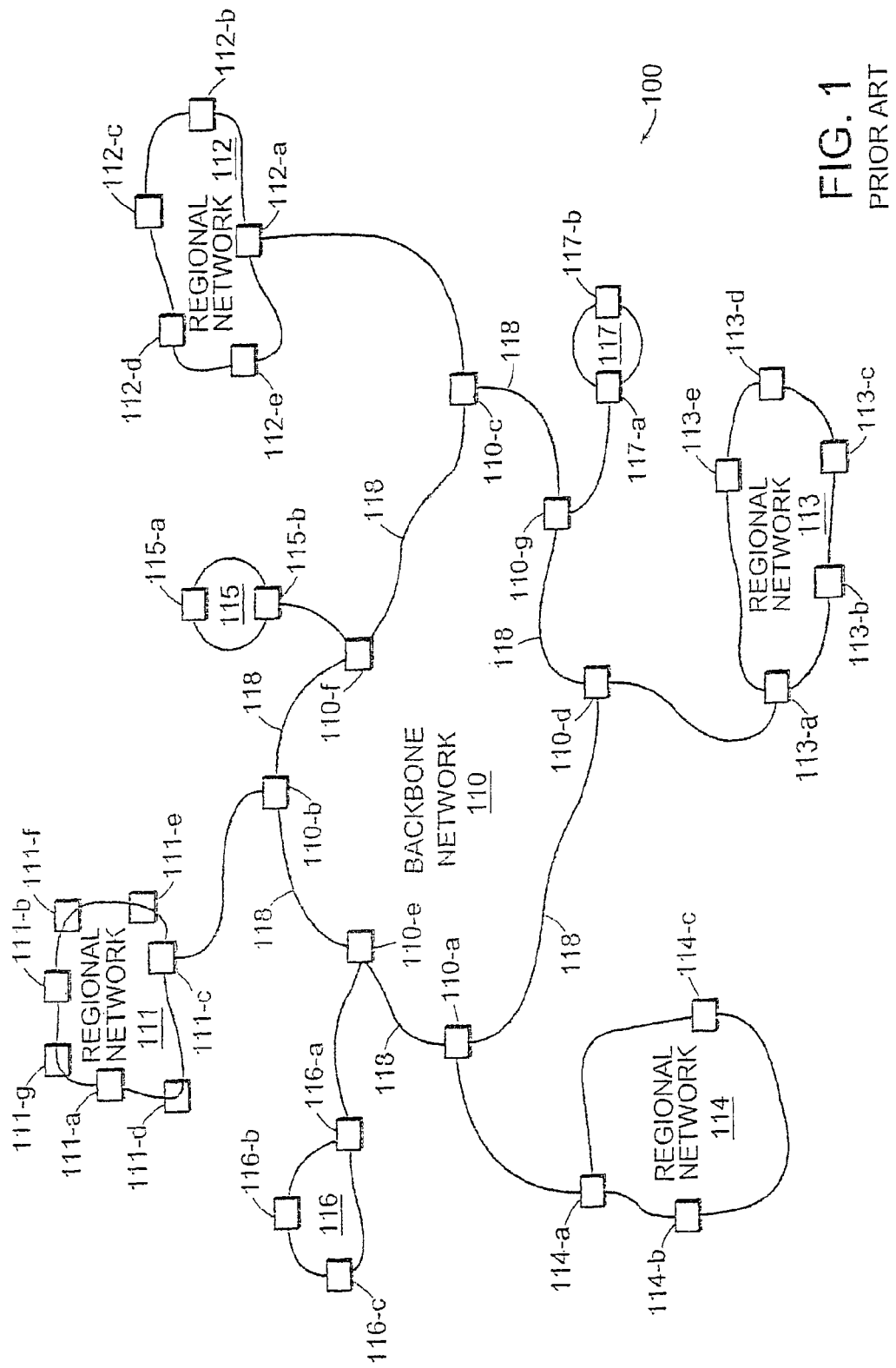
FIG. 1 illustrates a top-level view of a typical prior art computer network.

FIG. 1 illustrates a high level view of the architecture of a typical managed computer network 100. FIG. 1 is used to illustrate the concepts of hierarchical components and how a computer network can be viewed and represented as such. The invention, however, is not limited to being applied only to represent a hierarchical computer network architecture such as that of FIG. 1, even though preferred embodiments of the invention are well suited for this purpose. As will be explained in more detail later, the invention can be used to represent other forms of hierarchical data as well.

In FIG. 1, managed computer network 100 includes backbone network 110 which interconnects regional networks 111 through 117. Backbone network 110 is formed from high speed routers 110-a through 110-g interconnected with high speed data links 118. Each regional network 111 through 114 is formed from sets of routers labeled "a", "b", "c" and so forth within each regional network 111 through 117. Managed computer network 100 represents, for example, a corporate-wide computer network in which backbone network 110 spans a large geographical area such as an entire state and each regional network 111 through 117 represents the corporate computer network facilities within a specific region such as a city in that state.

Figure 2:
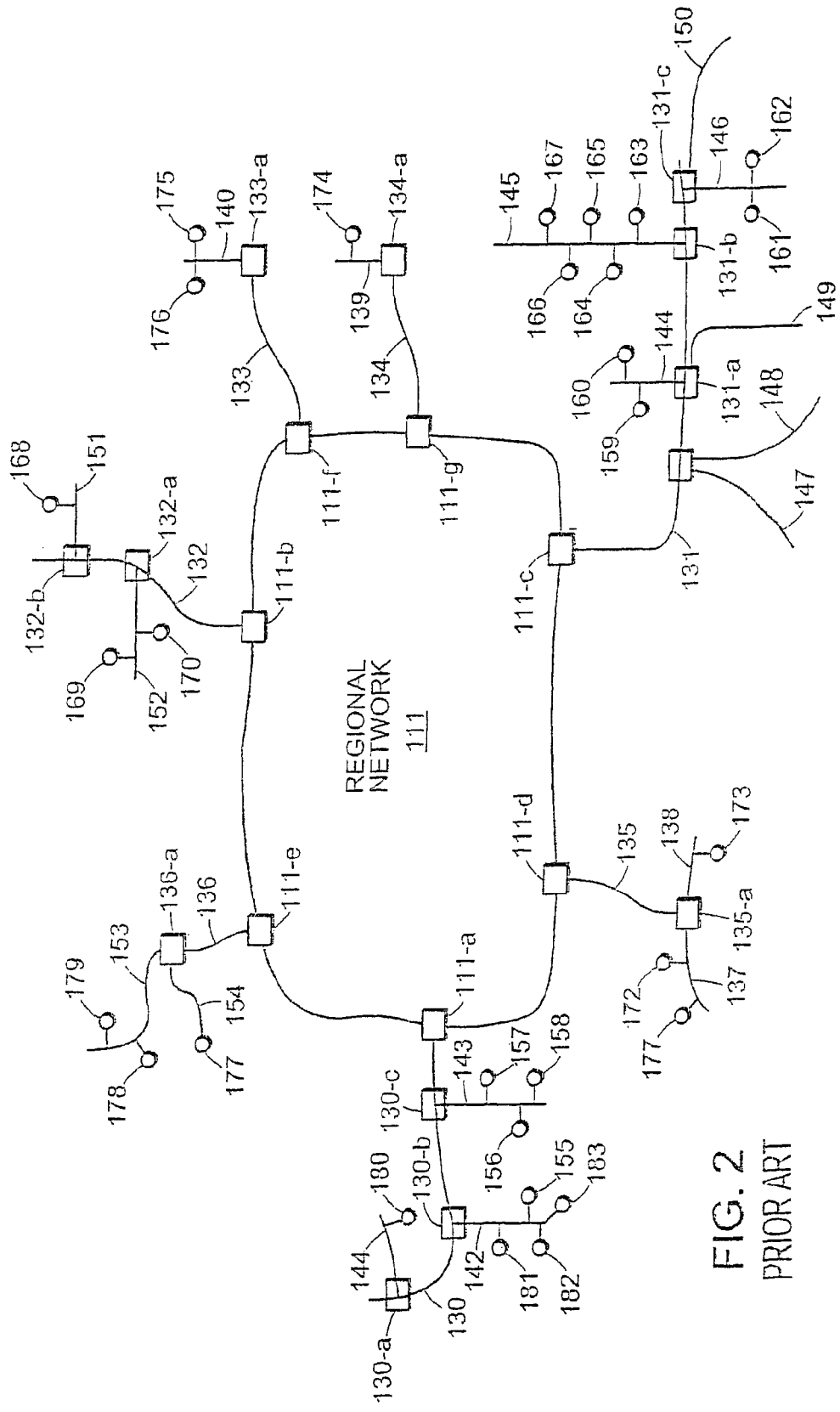
FIG. 2 illustrates a more detailed view of a particular segment of the prior art network shown in FIG. 1.

FIG. 2 illustrates a more detailed view of the regional network 111 illustrated in FIG. 1. Regional network 111 is formed from the interconnection of seven data communications hubs 111-a through 111-g. When regional network 111 is illustrated at this level of detail, it can be seen that the hubs 111-a through 111-g link departmental networks 130 through 136 to the regional network 111. Departmental networks 130 through 136 are formed from interconnected routers labeled "a", "b", "c" and so forth on each departmental network 130 through 136. Each departmental network 130 through 136 represents, for example, the computer network associated with a single department within the company owning the entire network 100. Extending from each departmental network 130 through 136 are several subnetworks 137 through 154. Connected to each subnetwork 137 through 154 are various computers, printers, file servers, network devices, and other computing systems referred to herein as networked hosts 155 through 183. During the operation of computer network 100, networked hosts 155 through 183 communicate packets, cells, frames, and other data between one another via the network infrastructure according to various data communications protocols.

In this example computer network 100, high speed routers 110-a through 110-g, hubs 111-a through 111-g, and regional network routers 130 through 136 can be controlled remotely via a network management application. The network management application is a software program which executes on a network management workstation. The network management workstation is represented, for example, by host 168 coupled to subnetwork 151 on departmental network 132 which extends from regional network 111. The departmental network 132 may be the systems administration department within the company that owns and operates network 100.

A network manager (i.e., a user) can use the network management software from host 168 to remotely control the operation and data flow between hosts and data communication devices on the network 100. Protocols such as the Simple Network Management Protocol (SNMP) and the Remote Monitoring (RMON) protocol can be used for this purpose. To assist the network manager in this task, the network management software application presents a graphical interpretation of the computer network 100 in the form of a graphical user interface (GUI). An example of such an interface in accordance with the parent invention is illustrated in FIGS. 3 through 6.

FIGS. 3 through 6 illustrate a graphical user interface configured according to a preferred embodiment of the invention. Absent the labeling of the elements in the figures provided for purposes of this description, each of FIGS. 3 through 6 is a representation of an actual screen-shot captured from a computer system executing a program embodying the invention.

Figure 3:
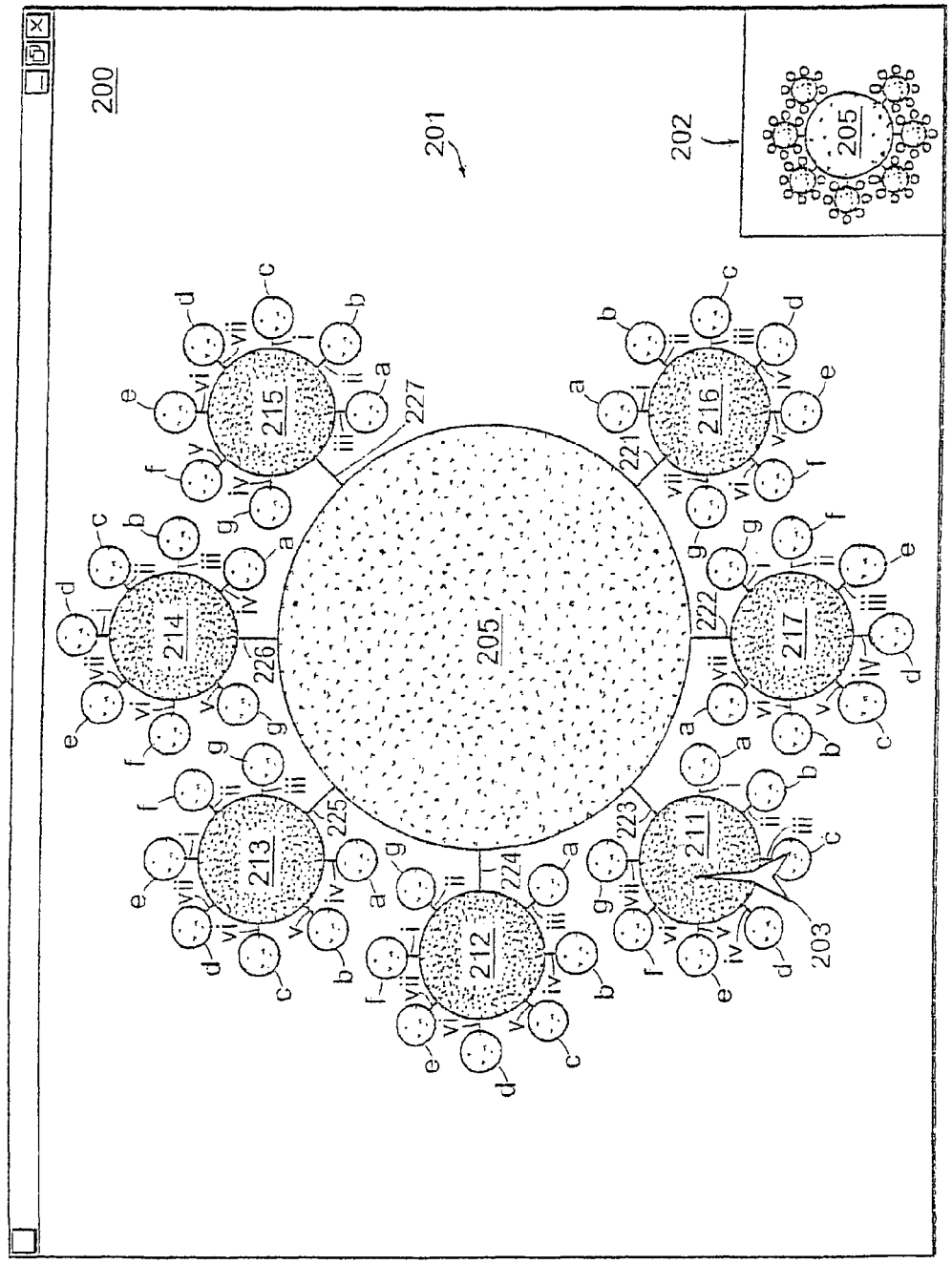
FIG. 3 is a top level view of the hierarchical interface configured according to the invention.

In FIG. 3, display 200 depicts a graphical user interface (GUI) 201 configured according to a preferred embodiment of the invention. GUI 201 represents hierarchical data in a graphical manner which quickly conveys to the user the hierarchical relationships which exist between different elements of the data. The hierarchy depicted by GUI 201 in FIG. 3, as will be explained in detail below, can be quickly grasped by a user viewing the display 200. The graphical hierarchy is accomplished through the use of scaling, size, placement and color or shading of the various elements that represent data and their interrelationships.

The GUI 201 includes a top node 205 and, for example, seven child nodes 211 through 217 symmetrically arranged in orbit around the centrally located top node 205. Each of the child nodes 211 through 217 is hierarchically related one level below the top node 205 in the data hierarchy, as conveyed graphically by the interface 201. The scaling and size of each child node 211 through 217, as compared to the top node 205, provides an indication of the hierarchical relationship between each node. Data links 221 through 227 indicate that the child nodes 211 through 217 directly relate from the top node 205 in the data hierarchy. That is, child nodes 211 through 217 are smaller than top node 205 and node 211 is coupled to top or central node 205 via a data link 223 which indicates that it is on a level in the hierarchy below that of top node 205. In other words the child nodes directly relate or depend from a top or central node 205.

In a similar manner, each child node 211 through 217 has, for example, seven respective child nodes A through G which are hierarchically related below child nodes 211 through 217. Again, the lower hierarchical relationship is indicated by the smaller size and scale of nodes A through G, as well as by the interconnection of data links "i" through "vii" which connect "back up" to nodes 211 through 217. In general, as shown in FIG. 3, top or central node 205 represents the top of the hierarchy, nodes 211 through 217 represent the second level of a hierarchy, and nodes A through G extending "down" from nodes 211 through 217 represent the third level in the hierarchy.

The view of GUI 201 in FIG. 3 can represent any type of hierarchical or stored data. In a preferred embodiment, each node (top node 205, child nodes 211 through 217, and "grandchild" nodes A through G) represents data related to elements of a computer network and GUI 201 is an interface employed by a network management application. An example of a network management application for which the technology provided by GUI 201 is designed is the CiscoWorks2000 network management software application produced by Cisco Systems, Inc. of San Jose, Calif.

As a more detailed example of how the GUI 201 represents a computer network, suppose the example computer network 100 illustrated in FIGS. 1 and 2 is represented by the GUI 201 in FIG. 3. In this case, the top node 205 represents and corresponds to the backbone network 110, while the child nodes 211 through 217 represent and correspond to the regional networks 111 through 117, respectively. Moreover, the nodes A through G of each of the child nodes 211 through 217 correspond to the departmental networks of regional networks in computer network 100. By way of example, regional network 111 in FIG. 2 is represented by child node 211 in the GUI 201 in FIG. 3 and child nodes 211-A through 211-G in FIG. 3 represent departmental network links 111-*a* through 111-*g* in FIG. 2, respectively.

Before further description of the operation of GUI 201 is given, another element of GUI 201 will be briefly explained. In FIG. 3, GUI 201 also includes a map 202 located in the lower right-hand corner of the display 200. Map 202 provides the user viewing display 200 with a conceptual view of where the user is located at any one moment in time within the overall hierarchy shown by the GUI 201. That is, map 202 provides an aerial or "forest through the trees" view of sorts. In FIG. 3, map 202 displays the same information as the main portion of GUI 201, since the view in FIG. 3 is the top level view of the hierarchy of data represented. As will explained, when a user selects a node in GUI 201, computational aspects of the invention change the level of the GUI 201 to a more or less detailed view of the selected node. In essence, the user can zoom in and/or zoom out to different levels in the hierarchy represented in GUI 201 by simply selecting a desired node to be displayed as the center node (e.g., top node 204 in FIG. 3) on the display 200. As will be explained, the map 202 provides a sense of where the user is within the hierarchy of GUI 201, aside from the view provided by the main portion (i.e., all but lower right hand corner) of GUI 201 as previously explained.

Upon start-up of a network management application configured with the GUI 201 according to this invention, the user is presented with the display 200 as it appears in FIG. 3. That is, preferably, the network management application presents a start-up view showing the top level of a network hierarchy. As previously explained, GUI 201 is presently configured in this example to show three levels of the network hierarchy which correspond to the backbone network 110, regional networks 111 through 117, and departmental networks A through G. More often than not, the user will want to navigate through the network hierarchy beyond (or below) the first three levels shown in FIG. 3.

To navigate using GUI 201, the user merely positions pointer 203 onto a desired node within GUI 201 and selects that node via a selection mechanism. A preferred embodiment of the computer system (i.e., network management station) of this invention employs a hand operated selection mechanism such as mouse or trackpad which controls the graphical pointer 203 on display 200. To select a node, pointer 203 is positioned over child node 211, for example, as illustrated in FIG. 3. In this example, selecting node 211 represents a decision by the user to see further details of regional network 111 (FIG. 2). Upon selection of child node 211, for example, by pressing one of two mouse buttons, the user is presented with a brief animated zoom-in process (to be explained) which results in the display 200 being formatted as shown in FIG. 4.

Figure 4:
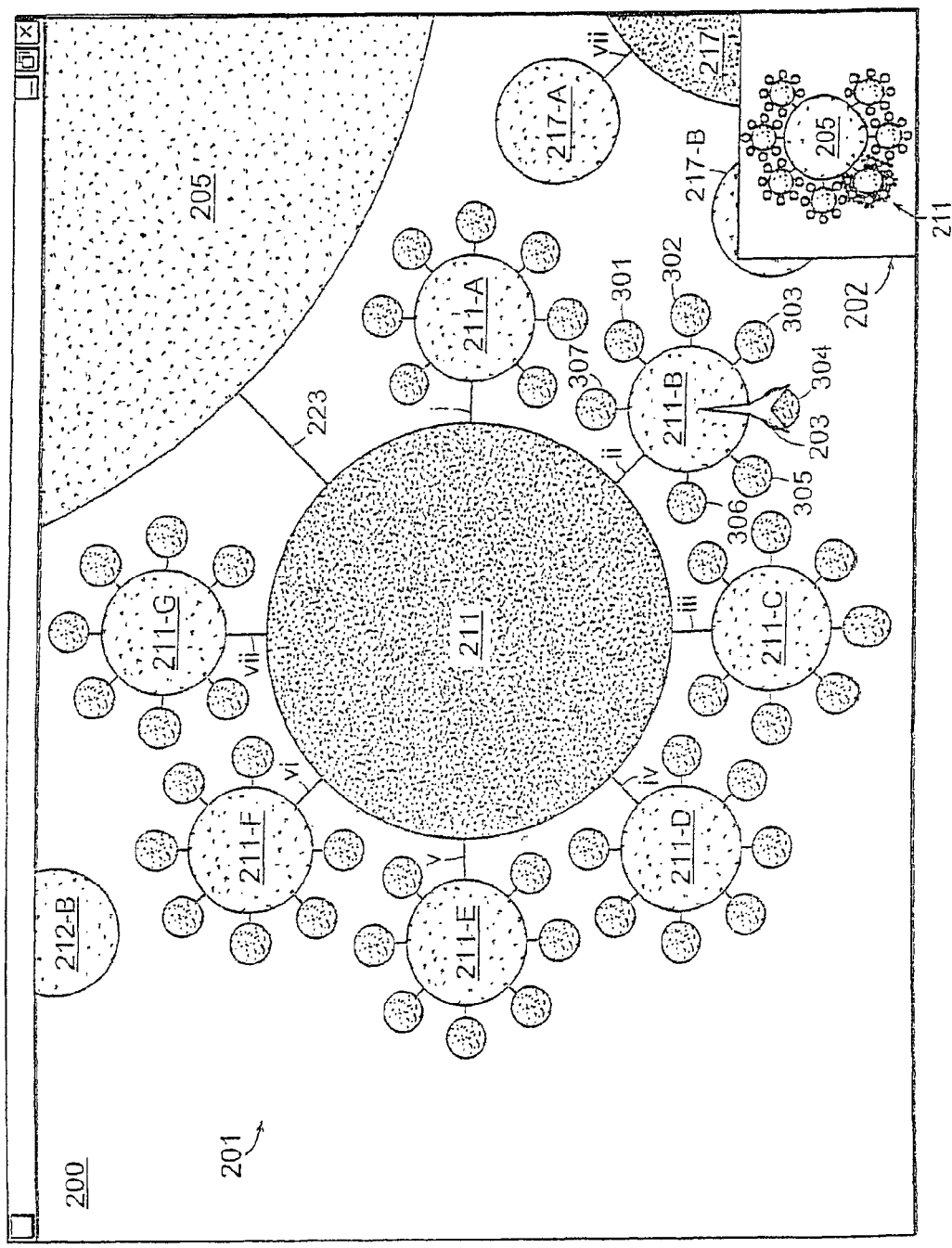
FIG. 4 is a view of a second level of the hierarchy for a selected node from the top level view of FIG. 3.

In FIG. 4, a close up or zoomed-in view of level two of the hierarchy represented by the GUI 201 is illustrated with a focus on node 211. Top node 205 is still visible as the large semi-circle in the upper right corner of display 200. However, the center of display 200 is now dominated by a more detailed view of node 211, which was selected by the user via pointer 203 in FIG. 3. Furthermore, the grand-child nodes 211-A through 211-G (i.e., grand-child nodes of top node 205) are now displayed as child nodes of node 211. Nodes 211-A through 211-G are displayed larger and are shown in more detail.

The GUI 201 in FIG. 4 also now displays the child nodes of nodes 211-A through 211-G which were previously not displayed in FIG. 3. Examples of child nodes of nodes 211-A through 211-G are nodes 301 through 307, each of which is directly hierarchically related below (i.e., is a child node of) node 211-B. Nodes 301 through 307 are child nodes of node 211-B and are grand-child nodes of node 211 and are great-grand-child nodes of top node 205. Note that only child nodes 301 through 307 are labeled in FIG. 4, and that the other nodes 211-A and 211-C through 211-G also have similarly positioned and related child nodes which have not been labeled.

In the network management example, the view presented in FIG. 4 corresponds to the view of computer network 100 in FIG. 2. Thus, node 211 represents regional network 111 and each node 211-A through 211-G corresponds to a respective one of departmental networks 131 through 137 in FIG. 2. As a specific example, node 211-B may represent departmental network 131 and nodes 301 through 307 which depend therefrom can represent subnetworks 144 through 150. In this manner, a network manager can navigate through a symbolic representation of network 100 via GUI 201.

Note that not all nodes in FIG. 4 are labeled in order to avoid confusion in the figure and to avoid drawing space limitations. It should also be noted that FIG. 4 may illustrate more nodes than are illustrated in the network 100 in FIG. 2. This is because FIG. 2 is given by way of example only, and is not an actual representation derived from a real network. However, the nodes in FIG. 4 and other figures are actually created based upon data that exists for elements of a hierarchical data structure.

Due to the hierarchical nature of FIG. 4, and other figures to be discussed, it is to be understood by the reader that nodes of similar size and hierarchical placement are on a similar hierarchical level as one another, and that not all nodes will be labeled in each figure. For example, the unlabeled nodes which directly depend from node 211-C are shown in the figure as being directly hierarchically related below node 211-C.

The display 200 of GUI 201 in FIG. 4 provides numerous indications to a user (e.g., a network manager) who is viewing the display 200 as to where that user "is" in relation to the hierarchy being represented. Top node 205 remains somewhat visible and data link 223 clearly shows the hierarchical relationship between top node 205 and its child node 211. Moreover, neighboring nodes 217 and its child nodes 217-A and 217-B are partially visible as well. The positioning of these neighboring nodes is made apparent during the animated transition that takes place from FIG. 3 to FIG. 4 upon selection of node 211 by the user using pointer 203.

While it is difficult to convey the animated nature of the transition from FIG. 3 to FIG. 4 using just these two figures alone, suffice it to say that the start of the operation is shown by FIG. 3. Then, upon selection of node 211 in FIG. 3, the network application employing the technology of this interface presents a brief series of more and more focused images, each of which shows a more zoomed in view of node 211 than the previous image, until the final image of display 200 is presented as it appears in FIG. 4. The entire animation process takes approximately one second, and displays approximately twenty or thirty separate images ranging in scale from the top zoomed-out or distant view in FIG. 3 to the zoomed-in or close-up view in FIG. 4. Each image is successively displayed as a sequence of graphical frames and provides the impression or the appearance that the user is getting closer and closer and is zooming-in to the selected node 211. In this manner, the user is presented with an animated zoom-in effect for the transition between FIGS. 3 and 4.

Another important characteristic of GUI 201 which is illustrated at the hierarchical level shown in FIG. 4 is the presentation of map 202. In FIG. 4, map 202 now indicates how node 211, which is the central node of display 200 in FIG. 4, fits into the higher level(s) of the hierarchy. As shown in map 202, top node 205 is shown, as well as child node 211. In map 202, each child node that depends from top node 205 is illustrated as having a number of child nodes. However, a distinction of child node 211 in map 202 in FIG. 4 is that node 211 (in the map 202) not only has its direct child nodes visible, but also has its grand-child nodes visible as well whereas other child nodes 212 through 217 do not. The user can quickly glance at map 202 to identify which node within the overall hierarchy is displayed on the central area of display 200. This due to the fact that only child node 211 in map 202 is drawn to the same level of detail as the larger image of node 211 and its children and grandchildren, as presented in the central portion of display 200.

Once the user has quickly grasped the information related to the hierarchy as presented in FIG. 4, the user can delve deeper into the hierarchy using the same process as previously described to effect the transition from FIG. 3 to FIG. 4. That is, in FIG. 4, as the user views the various nodes presented at various level by GUI 201, the user can decide to select another child (or a child's child) node, such as indicated by the positioning of pointer 203 over node 211-B. Upon selection of node 211-B, a similar zoom-in effect is carried out which results in the display 200 presenting GUI 201 as it appears in FIG. 5.

Figure 5:
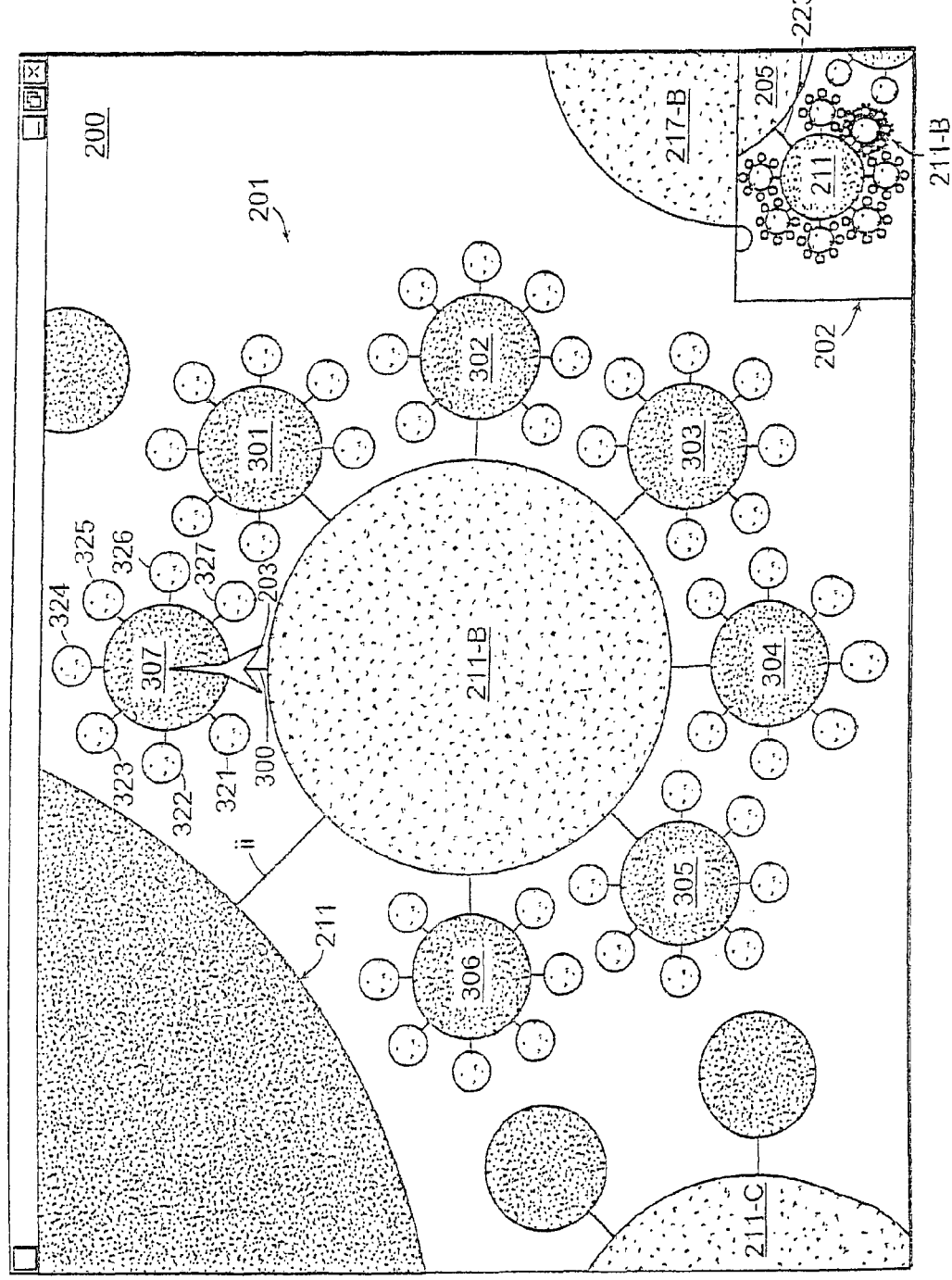
FIG. 5 is a view of a third level of the hierarchy for a selected node from the second level view of FIG. 4.

FIG. 5 shows the close-up or zoomed-in view of centrally positioned node 211-B after it has been selected in FIG. 4. In FIG. 5, parent node 211, which represents regional network 111, is visible in the upper left hand corner of display 200, and child nodes 301 through 307, which represent the subnetworks networks 144 through 150 (FIG. 2) are graphically drawn to a larger scale than they were in FIG. 4. Also shown in FIG. 5 are the child nodes of nodes 301 through 307. These nodes were not visible in FIG. 4. For example, node 307 has seven child nodes 321 through 327 which depend from node 307 in the hierarchy of network data represented by the nodes. Child nodes 321 through 327 represent computer equipment and devices within subnetwork 145. For example, nodes 321 through 325 may represent networked hosts 163 through 167. Other child nodes of nodes 301 through 306 are visible in FIG. 5, but are not labeled as their identity is clear from their depiction with GUI 201.

In FIG. 5, the map 202 also has been updated to provide the user with a sense of which node is being viewed as the central node on display 200. That is, map 202 displays the same information as the central part of display 200 within the map 202, and further provides a representation of higher level nodes in the hierarchy such as node 211, and top node 205. This allows a user to glance at the map 202 to gain a sense of position within the hierarchy displayed by GUI 201.

Again, should the user desire to view information relating to data elements and objects that are located lower in the hierarchy than the objects, elements or nodes displayed in FIG. 5, the user may again select a node which will become the central node in another view. As an example, in FIG. 5, the user can position pointer 203 on node 307 and select this node. Node 307 represents, for example, one of the departmental networks such as departmental network 145 from computer network 100 illustrated in FIG. 2. The transition process described above for displaying a zoomed-in view of a hierarchy level is repeated upon selection of node 307 and the user is presented with the GUI 201 displayed in FIG. 6.

Figure 6:
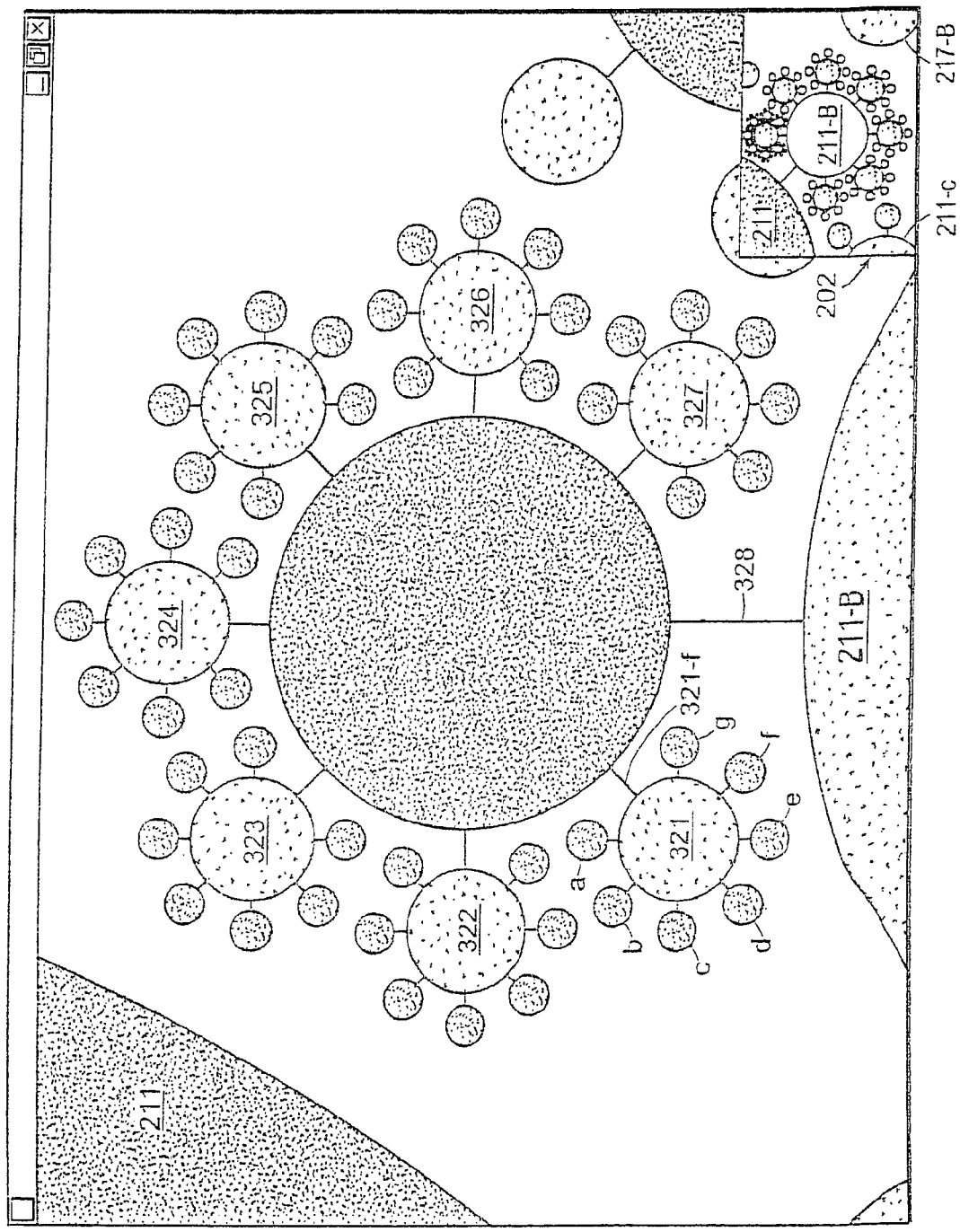
FIG. 6 a view of a fourth level of the hierarchy for a selected node from the third level view of FIG. 5.

FIG. 6 illustrates another view of another level of detail in the hierarchy represented by GUI 201. In FIG. 6, node 307, as selected from FIG. 5, is now the central node in the display 200. Node 307 represents, for example, subnetwork 145 which is illustrated in FIG. 2. The child nodes 321 through 327 are visible in larger scale and in more detail, and the child nodes of node 321 through 327 are also now in view. Likewise, map 202 is updated to indicate to the user where the current view of GUI 201 exists in the hierarchy of data represented.

As explained, the interface provided by embodiments of the invention provides a convenient mechanism to display hierarchical data. In a preferred embodiment, nodes from the examples given correspond to various elements or objects in a computer network environment. The nodes provide a wealth of information regarding the computer network element or object which they represent. Thus, in FIG. 6 for example, child nodes 321 through 327 represent actual computer or data communication equipment attached to subnetwork 145 in FIG. 2. For example managed host 163 may be represented by node 321 in FIGS. 5 and 6. As such, child nodes 321-a through 321-g represent, for example, various system or device data related to host 321.

It is to be understood that the example nodes within GUI 201 in FIGS. 3 through 6 are graphically created based upon mapped hierarchical data that is provided by the computer network management software. The data may be gathered, for instance, by the SNMP protocol which uses the computer network 100 to remotely query actual data communications and computer devices on the network 100. The devices respond with status information regarding many types of information.

For example, in FIG. 2, suppose networked computer device 163 on subnetwork 145 is a file server which serves files to other computer systems (i.e., devices 163, 164, 165 and 167) within subnetwork 145. Each node 321-a through 321-g, may represent a disk subsystem on the file server. If file server 163 is equipped with an SNMP agent, it can be remotely controlled and queried for information regarding the status of each disk node 321-a through 321-g by the network management workstation host 168, which is located across the regional network on departmental network 132 within subnetwork 151. The remote queries and control commands are provided by the network management software which incorporates the GUI 201. The SNMP protocol maintains a hierarchical database which is accessible to the network management workstation 168. If file server 163 suddenly loses access to one of its disks such as 321-d, the SNMP agent on file server 163 can signal this condition via an exception to the remotely located network management application on host 168. Upon receipt of this error condition, the network management software application can, for instance, alter the color of the node 321-g which represents the failed disk, as well as the color of node 321 which represents the file server 163 in GUI 201. The color alteration indicates that there is a problem with file server.

In the event that the network manager is viewing the top level of the network (e.g., FIG. 3) at the time the error occurs, the network management application configured according to this invention can propagate the error condition up to the top level of the hierarchy (i.e., display the error in FIG. 3). This is accomplished, for instance, by changing all data links (i.e. data links 321-f, 328, 300, 211-ii, and 223) leading to the lower level node 163 to indicate an error condition. The data links can be highlighted or can begin to flash on and off, for example. When the network administrator notices a data link that begins to flash to indicate an error, such as data link 223 in FIG. 2, the network administrator can "drill down" into the hierarchy via the aforementioned zoom-in node selection process. At each level, the network administrator can select the node that is linked to the next higher node in the hierarchy having a flashing or highlighted data link. Once the network administrator reaches a view such as that of FIG. 5, the node 321 which represents the device with error can be indicated in red, for example. The network manager can then directly select this node, which will cause node 321 to be the centrally located node on display 200. The administrator can then analyze data displayed within the node on the GUI 201 to determine the nature of the error with disk 321-*d*. The network management application can then use SNMP to control the file server 163 to either disable the faulted disk corresponding to 321-*d*, or to hot swap in a new disk, for example.

In another example, network management applications such as CiscoView and CiscoWorks2000 allow network managers to graphically view a network in real time. Real time network viewing means that devices can become active and inactive on the fly and can generate exceptions and SNMP conditions that must be handled appropriately. In a case where a device is using the Remote Monitoring (RMON) protocol to report its status, the network management application can set thresholds of error reporting for certain RMON situations. The color of nodes on GUI 201 can be altered accordingly, based on the RMON error and on threshold settings in effect. Through the use of the GUI 201 described herein, the network manager can reduce management overhead by selectively choosing to inquire only into those errors that propagate up the hierarchy to a visible node. The error level can be indicated by color. This can improve network troubleshooting capabilities and the GUI 201 can allow a network manager to quickly arrive at the location of the error, without having to scroll through lots of network segments and select a device or object at each hierarchical level. Instead, the invention allows the manager to skip many levels and head straight to the device with the problem. Moreover, the map 202 on the interface keeps the manager abreast of where he is in the network.

The aforementioned examples illustrate some of the usefulness of the functionality of GUI 201 configured according to the invention. Once hierarchical data is gathered for any purpose, the GUI 201 can be used to represent this data as noted above. The applicability of GUI 201 to network management applications is particularly advantageous in situations such as that described.

An important point to note with respect to GUI 201 is that not only does the interface provide the ability to zoom-in and drill down to low levels of hierarchical data, but the interface provides the ability to also zoom back out to upper levels in the hierarchy. In this case, the processes presented to the user is the exact opposite of zooming in.

In a preferred embodiment, to zoom out, the user can perform one of two steps. First, the user can merely select a node that appears anywhere on the GUI 201, including nodes within the map 202, that is above the present centrally located node on GUI 201. In such a case, the interface processing with perform an animated zoom-out process that progressively redraws the GUI 201 from the zoomed-in current view to the view of the selected node as being the centrally located node in GUI 201. By way of example, suppose the user is viewing GUI 201 as it appears in FIG. 6. If the user selects node 211 with pointer 203 from either the upper left hand corner of display 200, or from within the map 202, the GUI 201 will then scale all nodes and present a GUI that appears like that in FIG. 4, in which node 211 is the centrally located node. In this example, it is noted that the user has effectively jumped up or zoomed-out two levels in the hierarchy. That is, the user, by selecting node 211 from FIG. 6, has chosen to move up two levels and has requested to view the hierarchy from the level represented by node 211.

Note that moving up or zooming out and moving down or zooming in multiple levels can be performed in all instances, as long as the user can see a node somewhere on GUI 201, including nodes map 202, to which the user would like to zoom to. Thus three, four or more levels can be skipped in either the up or down hierarchical direction merely by selecting a visible node at the desired level.

The second way in which the user can zoom in or out is by using separate zoom-in and zoom-out buttons provided on the selection input device, such as a computer mouse. Most input devices such as mice are provided with computer systems and include at least two mouse buttons. In an alternative embodiment, the left button can be used to zoom-in one level, while the right button can be used to zoom-out one level. Thus, if pointer 203 is over any node within GUI 201, depending upon which button is depressed, the GUI 201 will either provide zoom-in or zoom-out processing to the next lower or higher hierarchical level.

The way in which the GUI 201 determines how to display, position, scale, and size each node will now be discussed in detail. Before an analysis of each step required to produce GUI 201 is provided, principles of the calculations involved as part of the invention will be provided in order to fully comprehend the processing steps involved.

The processing provided by the invention to create and display the nodes uses fractal geometry. A reference to the principles of fractal geometry is provided in "Fractal Geometry of Nature" by Benoit Mendelbrot, published in 1998 by WH Freeman & Co., ISBN 0716711869. The scaling of each node is controlled by a self-avoiding scaling size and placement schema.

In a preferred embodiment, this scaling, size and placement schema is based on the following principles. For any given node, the distance from the node's center to one of its child's center is called "s". The radius of a node on display 200 is denoted by "c", and a scaling factor that is used to create node sizes is denoted by "r". When comparing the size and scale of a parent node, in relation to one of its child nodes, the child node's radius is r*c. Furthermore, as one goes from a child node to the child's node child node (i.e., a grand child of the parent node), the distance between the centers of the child node and the child's child node is r*s. For a node to have equally spaced N child nodes, the scaling factor r is given by the formula:

$$r = \frac{1}{1 + 1/\sin(pi/N)}$$

and the optimal radius c is given by, and can be no bigger than:

$$c_n < \frac{s_n}{r+1}$$

for n=1, 2, 3, . . . Q, where Q is the maximum number of child levels to be displayed on GUI 201.

Using the above formulas, the nodes when displayed are guaranteed to be self-avoiding at all possible scales.

It is noted that for node peers (i.e, child neighbors) at the same hierarchical level, the connection between two of such nodes must be extended beyond twice the node family radius L, such that:

$$L = \sum_{n=1}^{\infty} s_1 * r^{n-1} = s_1/1 - r$$

That is, L is the radius of a parent node and all of its child nodes. The radius L thus originates from the center of the parent of a family of nodes, and extends to the perimeters of the furthest child. L is useful in situation where more that one parent or top node exists and are linked to each other in a non-hierarchical relationship. That is, there may be two node on the same level that are linked to each other.

In the above formulas, the root or top node always has a radius for calculation purposes of 1, and child nodes all have smaller radii. Using this notion, L can be used to properly computed the length of a connection formed between two parent nodes, once the number of children of each parent is known.

A preferred embodiment of GUI processing comprises a program written in an object-oriented programming language, such as Java or C++. When implemented in Java, the entire GUI 201 can be embodied within a Java applet. Using an object oriented language allows a class to be defined that describes all of the information related to a node. The code developed which created the example screens depicted in FIGS. 3 through 6 refers to each node as a bubble. Information such as the radius of the bubble, its position and relation to other parent bubbles in the hierarchy, how many and which child bubbles the bubble has, and what icon or graphical shape is to represent the bubble are all provided in the class describing each bubble.

Figure 7:
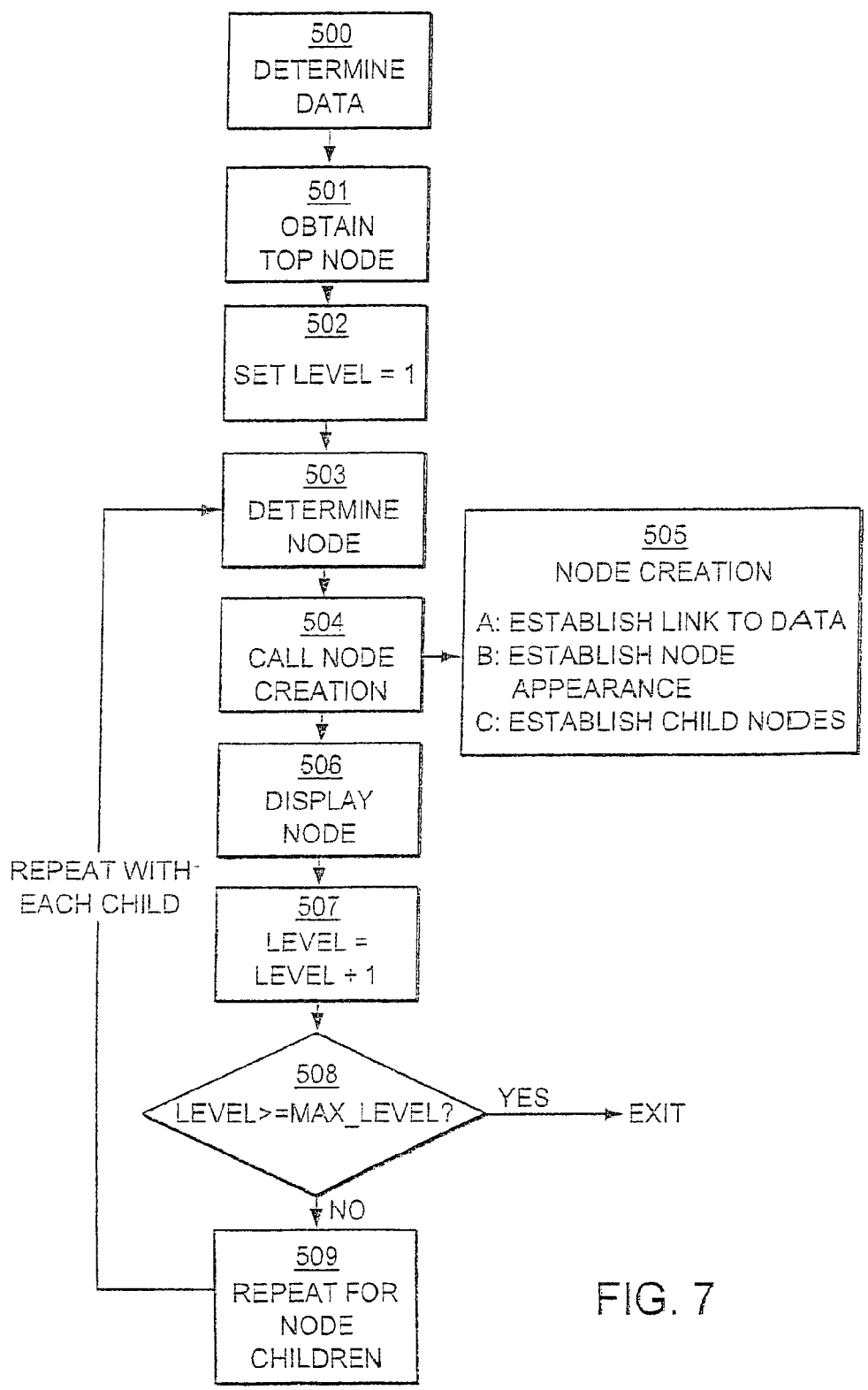
FIG. 7 is a flow chart of the processing steps involved to create, scale and position nodes on the graphical user interface based upon hierarchical data.

FIG. 7 illustrates a flow chart of the processing steps used in a preferred embodiment to create and graphically size, scale and position nodes that represent hierarchical data within GUI 201. In step 500, the GUI processing accepts the hierarchical data as a series of node data structures or objects. Hierarchical data may be obtained from a database, supplied over a network, generated at runtime, or otherwise provided by or to the application program providing the processing shown in FIG. 7. In a preferred embodiment, the program embodying the steps of FIG. 7 is a network management program and the hierarchical data relates to networked computing devices obtained via SNMP or another such network analysis or control protocol.

Once the hierarchical data is received in step 500, step 501 determines the root or top node of the data. Step 502 then sets a counter called LEVEL equal to a value of 1. LEVEL is used to control how many levels of the hierarchy are displayed on GUI 201, and has a maximum attainable value. The number of levels displayed can be preset or determined by a user via a selected parameter. Step 503 obtains the node selected in step 501 and determines which node is to be created. During the first execution of step 503, the only known node is the top node defined in step 501 from the data obtained in step 500. Step 504 then calls a node creation routine 505.

Node creation routine 505 first establishes a link to the data for the current node in step 505-*a*, and then establishes the current node's appearance in step 505-*b*. Step 505-*b* uses the fractal geometry to compute how the node will be drawn in the GUI 201. Step 505-*b* computes the radius for the node being created, as well as a scaling factor and also computes the positioning of the node, as it relates to other nodes represented by data in the hierarchy. Since the current node on the first pass of step 505 is the top node, the radius, as noted above, is always scaled to a value of 1, and the placement the top node, as the parent node on the screen, is always centered in the graphical user interface (i.e. 201 in FIGS. 3 through 6).

Each graphical object related to a node of data, as well as actual nodes of data (i.e., from the database), both contain information concerning what parent node that node or data depends from in the hierarchy, and each parent node data includes a list of all child nodes which depend from that node of data and hence from the graphical object. Once the current nodes appearance within GUI 201 has been determined, step 505-*c* then establishes the child node objects for the current node, as determined by examining the data link established via step 505-*a*.

Positioning or screen placement of each child node can be accomplished, in a preferred embodiment, in the following manner. Since the number of child nodes for any parent node is known from the data link obtained in step 505-*a*, the processing divides three hundred sixty degrees by the number of child nodes which will depend from a parent. The result is the angle of separation required for each child node to be displayed in a circumferential manner around a parent node. This allows each child node to be established in step 505-C with a parameter allowing even spacing of each child about the parent node. If only one child node exists, it can be placed at a user selectable location, as defined by parameter setting upon which GUI processing is based.

Once an object for each child node of the current node is established in memory, (but is not yet rendered on GUI 201), processing returns to step 506 where the current node fully created by steps 505-*a* through 505-*c* is displayed on GUI 201. If step 506 detects that a parent node of the node just displayed exists on the screen, step 506 then draws the interconnection from the parent node to the node just rendered. Each interconnection is a graphical object in and of itself and represents a data link between two nodes. To render each interconnection of data link, the coordinate center of the parent node and the coordinate center of the child node are used to draw a straight line between the two center points. In this manner, each data link appears graphically to interconnect the parent node to each of its child nodes.

Once the node is displayed in step 506, step 507 increments the LEVEL count by one, to indicate that a new level of the hierarchy has been rendered on GUI 201. In step 508, if LEVEL is greater than or equal to a maximum level value MAX_LEVEL, the current thread of processing finishes and exits. When all threads have displayed nodes up to the maximum level, each thread exits and the display processing of FIG. 7 is complete.

If the maximum number of hierarchical levels has not been displayed on GUI 201 step 508 allows step 509 to call processing step 503 repeatedly as a separate processing thread for each child node established as an object in memory in step 505-*c*. As such, step 503 effectively is a recursive entry point into the processing which gets passed a child object to treat as a new object from which other children may depend. In this manner, the children of each child node object get established, and each child object then gets created by the processing of steps 505-*a* through 505-C and the child node gets displayed in step 506. Once the LEVEL counter reaches the maximum levels for the thread of each child processing routine, processing recursively exits that thread and no more nodes are established or displayed.

It is to be understood that the processing provided beginning at the top node can effectively be used beginning at any other node, as provided by a user selecting a node via pointer 203 in GUI 201. Thus, if a user selects a low level node in the hierarchy with a mouse, the processing treats the selected node as the top level node at step 501 for purposes of rendering any child nodes. The same is true for zoom-out processing. In this case, an upper level node that is selected is treated as the central or top node for purposes of the processing of FIG. 7. In this manner, the graphical nodes are displayed as explained above.

Note that the map 202 as previously described is merely treated as a smaller screen in the low corner of display 200. Thus all drawing and scaling are the same as for the main part of display 202, except that the scaling is much smaller.

It is to be understood that the invention contemplates not only application of the general technology provided by GUI 201 as explained herein but also specific application of this technology to uses such as network management and navigation, and file system management, and other applications requiring such an interface and hierarchical navigation system between interrelated hierarchical data elements.

Figure 8:
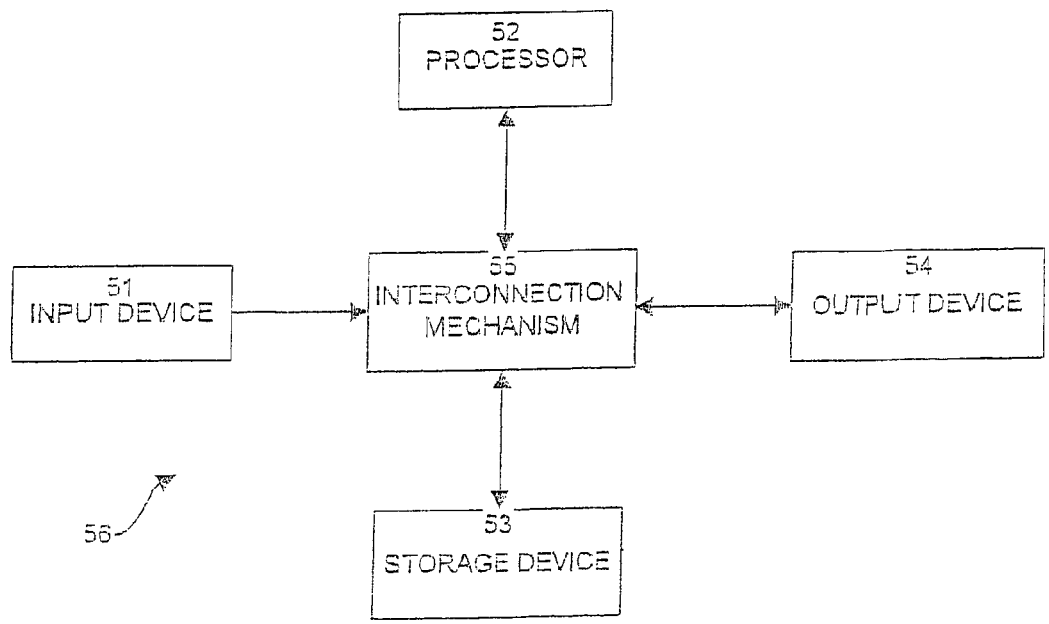
FIG. 8 illustrates the architecture of a computing system which implements the processing according to the present invention.

As previously noted, embodiments of the invention may be implemented on a computer system. An example architecture of such a computer system is illustrated in FIG. 8. In FIG. 8, the computer system 56 comprises inter-coupled components 51 through 55. The computer system 56 generally includes an interconnection mechanism 55 coupling an input device 51, a processor 52, a storage device 53 and an output device 54. In a preferred embodiment of this invention, the computer system 56 is the network management station previously described.

The input device 51 receives data in the form of commands, computer programs or data files such as hierarchical database files and other information as input to the computer system 56 from users or other input sources. Typical examples of input devices include a keyboard, a mouse, data sensors, and a network interface connected to a network to receive another computer system's output.

The interconnection mechanism 55 allows data and processing control signals to be exchanged between the various components 51 through 54 of the computer system 56. Common examples of an interconnection mechanism are a data bus, circuitry, and in the case of a distributed computer system, a network or communication link between each of the components 51 through 54 of computer system 56. The computer network 100 is an example of an interconnection mechanism between different computers.

The storage device 53 stores data to be processed by the computer system 56. Typical storage devices may include computer memory and non-volatile memory such as hard disks, optical disks, or file servers and database servers locally attached to the computer system 56 or accessible over a computer network.

The processor 52 executes computer programs loaded into the computer system 56 from the input or storage devices. Typical examples of processors are Intel's Pentium, Pentium II, and the 80x86 series of microprocessors; Sun Microsystems's SPARC series of workstation processors; as well as dedicated application specific integrated circuits (ASIC's). There may be many processors or just a single processor. The processor 52 may also be any other microprocessor used in computing devices for performing information processing.

The output device 54 is used to output information from the computer system 56. Typical output devices may be computer monitors, displays, LCD screens or printers, speakers or recording devices, or network connections linking the computer system 56 to other computers. A computer device such as that shown in FIG. 8 commonly has multiple input, output and storage devices as well as multiple processors.

Generally, in operation, the computer system 56 shown in FIG. 8 is controlled by an operating system. Typical examples of operating systems are MS-DOS, Windows95 Windows98 and Windows NT from Microsoft Corporation, or Solaris and SunOS from Sun Microsystems, Inc. These terms may be trademarks of their respective companies. As the computer system 56 operates, input such as text data, text file or Web page data, programs, commands, and database data including hierarchical data, received from users or other processing systems, may be temporarily stored on storage device 53. Certain commands cause the processor 52 to retrieve and execute stored programs, such as a program implementing the hierarchical data representation processes of the invention as discussed above.

The programs executing on the processor 52 may obtain more data from the same or a different input device, such as a network connection providing data from another computing device on a computer network. The programs may also access hierarchical data in a database or file for example, and commands and other input data may cause the processor 52 to begin to perform operations on the input data. Data may be generated which is sent to the output device 54 to be either displayed, such as GUI 201, saved, or further processed. The output data may be held for transmission to another computer system or device for further processing by other application programs as well.

Typical examples of the computer system 56 are personal computers and workstations, hand-held computers, dedicated computers designed for a specific purposes, and large main frame computers suited for use by many users. The invention is not limited to being implemented on any specific type of computer system or data processing device, nor is it limited to a single processing device or type of computer network.

It is noted that the invention may be implemented in hardware or circuitry which embodies the logic and processing disclosed herein, or alternatively, the invention may be implemented in software in the form of a self contained software package or application, or other type of program stored on a computer readable medium like a CD-ROM disk or floppy disk(s), such as the storage device 53 shown in FIG. 8. In the later case, the invention in the form of computer program logic and executable instructions is read and executed by the processor 52 and instructs the computer system 56 to perform the functionality disclosed as the invention.

If the invention is embodied as a computer program or as software on a disk, the computer program logic is not limited to being implemented in any specific programming language. The invention in software may be written in an object oriented language, or may be written in a structured or unstructured programming language. For example, commonly used programming languages such as C, C++, JAVA, FORTH, Visual BASIC, as well as others, such as list processing languages may be used to implement the logic and functionality of the invention. Furthermore, the subject matter of the invention is not limited to implementation on currently existing computer processing devices or programming languages, but rather, is meant to be able to be implemented in many different types of environments in both hardware and software which exists now and that will exist in the future.

Furthermore, combinations of embodiments of the invention may be divided into specific functions and implemented on different individual computer processing devices, processors and/or systems which may be interconnected to communicate and interact with each other over a network or a data bus, for example. Dividing up the functionality of the invention between several different computers is meant to be covered within the scope of the invention as well.

A preferred embodiment of the invention is documented in Appendix A on the associated Master and Duplicate Master CD-ROMs filed concurrently herewith having file name "2386-1034-000 Appendix A—Source Code.txt", created Jul. 18, 2003, 46.2 Kbytes as source code written in the JAVA programming language. All copyright in the source code listed in Appendix A is reserved by its appropriate owner(s). It is a violation of copyright law to duplicate this code, other than for patent distribution purposes. It is to be understood that unauthorized creation, duplication, or encoding of the JAVA code listed in Appendix A onto a computer readable medium, such as an optical or magnetic storage medium such as a computer disk, also constitutes patent infringement of the invention defined in this patent, and as covered by one or more of the claims herein. It is also to be understood that unauthorized execution of the code in Appendix A by a computer processing apparatus constitutes patent infringement of one or more claims of this patent.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A computer system comprising:
   at least one input device;
   an output device;
   a memory device;
   a processing unit coupled to the input device, the output device and the memory device, the processing unit executing a computer program stored in the memory device, the computer program controlling the output device to display a graphical user interface and controlling the at least one input device to accept input to manipulate a view of objects displayed within the graphical user interface;
   the graphical user interface displaying objects derived from hierarchically arranged data wherein each object displayed is graphically scaled in size, proportion, and relative position according to a hierarchical level of each object, and wherein the number of objects displayed are limited to within a predetermined number in which, if the data exceeds the predetermined number, at least one object represents multiple objects.

2. The computer system according to claim 1 wherein the processing unit is adapted to accept data, grouped automatically or manually, that are represented by said at least one object.

3. The computer system according to claim 1 wherein the predetermined number is about seven.

4. The computer system of claim 1, wherein an object hierarchically related directly above another object in the hierarchy is a parent object and the graphical user interface includes at least one centrally located parent and an object hierarchically related directly below an object in the hierarchy is a child object and is displayed radially adjacent to the parent object; and wherein the input device may be used to select a child object on the graphical user interface and, in response, the computer program will generate a zoom-in view of that child object including any child objects related to that child object.

5. The computer system of claim 4 wherein
   the graphical user interface displays a first view of individually selectable hierarchically arranged objects including a parent object and a plurality of child objects peripherally arranged about the parent object; and
   upon a zoom-in selection of a child object with the at least one input device, the processing unit executes the computer program to transform the display of the graphical user interface to a zoomed-in view in which the parent object is relocated and proportionally increased in size to appear as grand-parent object and the child object selected is relocated and proportionally increased in size to appear as a centrally located parent object and wherein previously undisplayed child objects that are hierarchically related below the child object selected become displayed and peripherally arranged about the centrally located parent object.

6. The computer system of claim 5, wherein upon selection of the child object, the grand-parent object becomes no longer displayed and the centrally located parent object is relocated and proportionally increased in size to appear as a new grand-parent object.

7. The computer system of claim 1, wherein an object hierarchically related directly above another object is a parent object and an object hierarchically related directly below another object is a child object; and wherein the input device may be used to select a parent object and, in response, the computer program will generate a zoom-out view of that parent object by removing any child objects previously displayed and by displaying all child objects related to the selected parent object to a specific level of detail in the hierarchy of data.

8. The computer system of claim 7 wherein
   the graphical user interface displays a first view of individually selectable hierarchically arranged objects including a grand-parent object, a centrally located first parent object and a plurality of child objects peripherally arranged about the centrally located parent object; and
   upon a zoom-out selection of the grand parent object with the at least one input device, the processing unit executes the computer program to transform the display of the graphical user interface to a zoomed-out view in which child objects disappear from the graphical user interface and the first parent object is proportionally reduced in size to appear as a child object and the grand-parent object is relocated and proportionally reduced in size to appear as a centrally located parent object and the child object and other previously undisplayed child objects are hierarchically related below the centrally located parent object become displayed and peripherally arranged about the centrally located parent object.

9. The computer system of claim 1, wherein the processing unit executes the computer program to allow the input device to specify a number of hierarchy levels to be displayed and the computer program controls the output device to display, on the graphical user interface, a total number of objects that is dependent upon the number of hierarchy levels specified.

10. The computer system of claim 9, wherein the graphical user interface further includes a locale map providing a user with an indication of where in the hierarchy the objects exist that are currently on display in the graphical user interface.

11. The computer system of claim 1, wherein the hierarchically arranged data associated with any object displayed represents data associated with a managed device on a computer network.

12. The computer system of claim 11, wherein the color of an object on the graphical user interface depicts information concerning the state of the managed device which the object represents.

13. The computer system of claim 12, wherein if an object having associated corresponding data in the hierarchy contains a fault, the fault is reflected in the data for that object in the hierarchy of data and is reflected to objects above that object in the hierarchy of data such that, in the graphical user interface, objects that are displayed and that are hierarchically related above the faulted device include a visible indication of the presence of the fault located below that object, thus providing an indication on the graphical user interface of a selected object path to follow to find the fault.

14. The computer system of claim 1, wherein the objects displayed appear circular in nature and wherein the computer program employs fractal geometry to properly display each object without overlapping other objects and properly scales each object in relation to a hierarchy of all objects in the hierarchically arranged data.

15. A computer system comprising:
at least one input device;
an output device;
a memory device;
a processing unit coupled to the input device, the output device and the memory device, the processing unit executing a computer program stored in the memory device, the computer program controlling the output device to display a graphical user interface and controlling the at least one input device to accept input to manipulate a view of objects displayed within the graphical user interface;
the graphical user interface (i) displaying objects derived from hierarchically arranged data, wherein each object displayed is graphically scaled in size, proportion, and relative position according to a hierarchical level of each object, (ii) is adapted to accept zoom-in and zoom-out requests from a user to view the objects in selectable scales, and (iii) applies animation in changing scales.

16. The computer system of claim 15, wherein each object displayed on the graphical user interface is depicted graphically as being interconnected to other objects to which it is directly related to in a hierarchy of the data, so as to form a graphical representation of the hierarchical nature of each object as it relates to other objects.

17. The computer system of claim 15, wherein an object hierarchically related directly above another object in the hierarchy is a parent object and the graphical user interface includes at least one centrally located parent and an object hierarchically related directly below an object in the hierarchy is a child object and is displayed radially adjacent to the parent object; and wherein the input device may be used to select a child object on the graphical user interface and, in response, the computer program generates a zoom-in view of that child object including any child objects related to that child object.

18. The computer system of claim 17 wherein
the graphical user interface displays a first view of individually selectable hierarchically arranged objects including a parent object and a plurality of child objects peripherally arranged about the parent object; and
upon a zoom-in selection of a child object with the at least one input device, the processing unit executes the computer program to transform the display of the graphical user interface to a zoomed-in view in which the parent object is relocated and proportionally increased in size to appear as a grand-parent object and the child object selected is relocated and proportionally increased in size to appear as a centrally located parent object and wherein previously undisplayed child objects that are hierarchically related below the child object selected become displayed and peripherally arranged about the centrally located parent object.

19. The computer system of claim 18, wherein upon selection of the child object, the grand-parent object becomes no longer displayed and the centrally located parent object is relocated and proportionally increased in size to appear as a new-grand-parent object.

20. The computer system of claim 15, wherein an object hierarchically related directly above another object is a parent object and an object hierarchically related directly below another object is a child object; and wherein the input device may be used to select a parent object and, in response, the computer program will generate a zoom-out view of that parent object by removing any child objects previously displayed and by displaying all child objects related to the selected parent object to a specific level of detail in the hierarchy of data.

21. The computer system of claim 20 wherein
the graphical user interface displays a first view of individually selectable hierarchically arranged objects including a grand-parent object, a centrally located first parent object and a plurality of child objects peripherally arranged about the centrally located parent object; and
upon a zoom-out selection of the grand parent object with the at least one input device, the processing unit executes the computer program to transform the display of the graphical user interface to a zoomed-out view in which child objects disappear from the graphical user interface and the first parent object is proportionally reduced in size to appear as a child object and the grand-parent object is relocated and proportionally reduced in size to appear as a centrally located parent object and the child object and other previously undisplayed child objects that are hierarchically related below the centrally located parent object become displayed and peripherally arranged about the centrally located parent object.

22. The computer system of claim 21, wherein upon selection of the grand parent object, an object hierarchically above the grand parent object becomes displayed as a new grand parent object.

23. The computer system of claim 15, wherein the processing unit executes the computer program to allow the input device to specify a number of hierarchy levels to be displayed and the computer program controls the output device to display, on the graphical user interface, a total number of objects that is dependent upon the number of hierarchy levels specified.

24. The computer system of claim 23, wherein the graphical user interface further includes a locale map providing a user with an indication of where in the hierarchy the objects exist that are currently on display in the graphical user interface.

25. The computer system of claim 15, wherein the hierarchically arranged data associated with any object displayed represents data associated with a managed device on a computer network.

26. The computer system of claim 25, wherein the color of an object on the graphical user interface depicts information concerning the state of the managed device which the object represents.

27. The computer system of claim 26, wherein if an object having associated corresponding data in the hierarchy contains a fault, the fault is reflected in the data for that object in the hierarchy of data and is reflected to objects above that object in the hierarchy of data such that, in the graphical user interface, objects that are displayed and that are hierarchically related above the faulted device include a visible indication of the presence of the fault located below that object, thus providing an indication on the graphical user interface of a selected object path to follow to find the fault.

28. The computer system of claim 15 wherein the objects displayed appear circular in nature and wherein the computer program employs fractal geometry to properly display each object without overlapping other objects and properly scales each object in relation to a hierarchy of all objects in the hierarchically arranged data.

29. The computer system of claim 1, wherein the graphical user interface is configured to display zoomed-in and zoomed-out views of various combinations of the displayed objects, wherein in each of the possible zoomed-in and zoomed-out views each object displayed is graphically scaled in size, proportion, and relative position according to a hierarchical level of each object.

* * * * *